United States Patent [19]

Hyyppä

[11] Patent Number: 4,811,228
[45] Date of Patent: Mar. 7, 1989

[54] METHOD OF NAVIGATING AN AUTOMATED GUIDED VEHICLE

[75] Inventor: Kalevi Hyyppä, Luleå, Sweden

[73] Assignee: Inik Instrument Och Elektronik, Luleå, Sweden

[21] Appl. No.: 72,257

[22] PCT Filed: Sep. 16, 1986

[86] PCT No.: PCT/SE86/00413
§ 371 Date: Jun. 29, 1987
§ 102(e) Date: Jun. 29, 1987

[87] PCT Pub. No.: WO87/01814
PCT Pub. Date: Mar. 26, 1987

[30] Foreign Application Priority Data

Sep. 17, 1985 [SE] Sweden ............................ 8504299

[51] Int. Cl.⁴ .............................................. G06F 15/14
[52] U.S. Cl. ..................... 364/424.02; 180/169
[58] Field of Search ............ 364/424, 436, 443; 180/167, 168, 169; 356/1, 152, 4, 375

[56] References Cited

U.S. PATENT DOCUMENTS

| | | | |
|---|---|---|---|
| 4,225,226 | 9/1980 | Davidson et al. | 356/1 |
| 4,533,918 | 8/1985 | Virnot | 343/451 |
| 4,729,660 | 3/1988 | Tsumura et al. | 364/424 X |

FOREIGN PATENT DOCUMENTS

| | | |
|---|---|---|
| 1146428 | 6/1985 | European Pat. Off. . |
| 3305119 | 8/1984 | Fed. Rep. of Germany . |
| 2526181 | 4/1983 | France . |
| 1181162 | 2/1970 | United Kingdom . |
| 2143395 | 2/1985 | United Kingdom . |

Primary Examiner—Eugene R. Laroche
Assistant Examiner—David Mis
Attorney, Agent, or Firm—Merchant, Gould, Smith, Edell, Welter & Schmidt

[57] ABSTRACT

Method of navigating a vehicle (11) moving generally in one plane in which the actual position and direction (L) of the vehicle is determined by measuring the angles in said plane from a reference point of the vehicle (X, Y) to fixed points in relation to a reference direction on the vehicle. A plurality of points ($X_1Y_1$, $X_2Y_2$, $X_3Y_3$) anonymous but fixed as to the position thereof are arranged for the navigation, and the position of all the fixed points together with existing sight obstacles between the reference point of the vehicle and the fixed points are registered in an electronic memory. The movement of the vehicle in said plane is initiated in a known position and with a known direction for identifying the fixed points visible from the reference point in said position. In each position and direction of the vehicle during movement thereof the latest known position and direction are utilized in determining the identify of the fixed points visible at that moment.

10 Claims, 7 Drawing Sheets

METHOD OF NAVIGATING AN AUTOMATED GUIDED VEHICLE

The invention is related to a method of navigating an automated guided vehicle.

In industry there is an increased use of automated guided vehicles in transporting goods and material between different stations in storing premises and workshops. Then, the trucks are controlled automatically along predetermined paths between the various stations. In a reliable method of the truck steering the truck control system detects a cable loop arranged within or on the floor, or a painted loop on the floor. Such a control system is very reliable and simple to use but the conditions in the premises where the trucks are being used, are not always such that it is suitable to use a control loop within or on the floor, and in addition to this the system suffers from the no little drawback that the truck movement is limited strictly to the paths defined by the control loop, and that these paths cannot easily be altered because they are permanent installations.

Accordingly, systems of navigating automated guided trucks have been developed wherein the truck movement is not restricted to a permanently arranged control loop, the truck being provided with apparatus continuously defining its current position in relation to fixed objects in the premises through which the truck is moving. The present invention is related to this type of navigation system and accordingly concerns a method of navigating a vehicle moving generally in one plane in which a calculation of the current position and direction of the vehicle is effected by measuring the angles in said plane from a reference point on the vehicle to fixed positions in relation to a reference direction on the vehicle.

In a prior art systems for free navigation of automated guided vehicles a laser beam is used detecting reflectors fixedly arranged in the premises where the truck is moving. This system is called TURTLE and is described in the FMS Magazine, July 1983, pp 232-236. It is based on the fact that the truck for each position to be determined "sees" a number of fixedly arranged reflectors in the premises and that these reflectors can be identified, which is effected by the optical signal emitted from each of the reflectors, being coded. This is done by the laser beam emitted from the truck scanning over 360° and, when passing a reflector, generating a bar coded reflected signal.

Another prior art system described in Journal of Dynamic Systems, Measurement, and Control Vol. 105, September 1983, pp 152-155 is based on a type of position calculation similar to the TURTLE-system, but using instead of laser light ultra sound for locating and identifying the fixed positions in the space. From each fixed position a sound signal is then emitted having a predetermined frequency unique to the actual position. The latter system is similar to the system described in Robotics Age, March/April 1983, pp 31-33 and which is also subject matter of U.S. Pat. No. 4,328,545. However, in that case beacons are provided in the fixed positions for emitting light individually coded such that a receiver on the truck can identify the beacon emitting the light signal.

As far as the inventor of the present invention knows, prior art systems for free navigation of automated guided trucks are based on the fact that the signals received by the truck to be used for calculation of the current position of the truck, are specific to the points from which they originate, and can be used to identify these points. This is a limitation of the prior art systems, and the object of the invention is to make possible the use of simple and inexpensive reflectors providing the signals from the fixed points in the space without the necessity of coding these signals for identifying purposes. At the same time it will be possible to determine the position even if some of the fixed points are temporarily hidden or there are reflectors not associated with the system.

For this object the method according to the invention has been given the characteristics appearing from claim 1.

In order to explain the invention in more detail reference is made to the accompanying drawings, in which.

Figure 1:
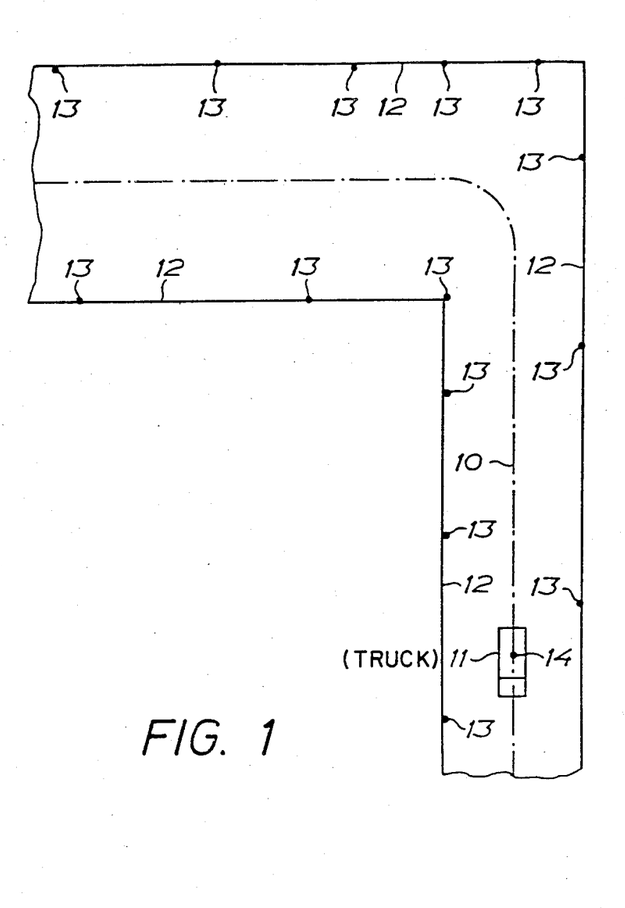
FIG. 1 is a plan view of premises through which an automated guided truck is to navigate by applying the method according to the invention.

With reference to FIG. 1 a possible path 10 is shown to be followed by an automated guided truck 11 by applying the method according to the invention. The path extends through a free space in the premises, limited by the walls of the premises and/or objects existing therein, such as machines, storage racks or the like, here generally indicated with 12. The free space through which the truck can move does not actually have to be limited by fixed objects or be enclosed by walls; the space for the truck movement may be limited to a certain area having a specific shape and extension in the horizontal plane for other reasons. When utilizing the method according to the invention a plurality of reflectors 13 shall be mounted in the motion space, the reflectors being of the most simple and inexpensive type and are suitably made of reflecting tape, for instance of the type marketed by 3M Svenska AB under trademark SCOTCH LITE. The tape may be attached directly to walls or objects or may be mounted on located vertically standing pins and having a diameter of about 20 mm. The tape should have some extension in the vertical direction. Behind the reflectors a dark background should be arranged to make the reflectors sharply outlined against the background.

On the truck an optical system 14 is arranged for emitting a laser beam scanning 360°. The truck is constructed in a special way for the mounting of the optical system, FIG. 2 and FIG. 3. Thus, it comprises a chassis 15 supported on two uprights or columns 16 and two flanges or webs 17 the body 18 of the truck, leaving a gap 19 between the chassis and the body. In this gap the optical system 14 is mounted in such a way that the flanges or webs 17 extend radially to the vertical scan movement axis 20. In that way there is an almost unbroken area for the scanning laser beam around the axis 20 at a level close to the floor or ground. Though the beam per se is harmless, a lot of people are of the opinion that every laser beam, though being weak, is dangerous to the eyes. In the described arrangement the beam is far below eye-level, this placing of the optical system providing also the advantage that the body and the load carried thereon at no occasion screens the laser beam during the scanning movement thereof, which is not the least important for a secure and reliable navigation.

Figure 2:
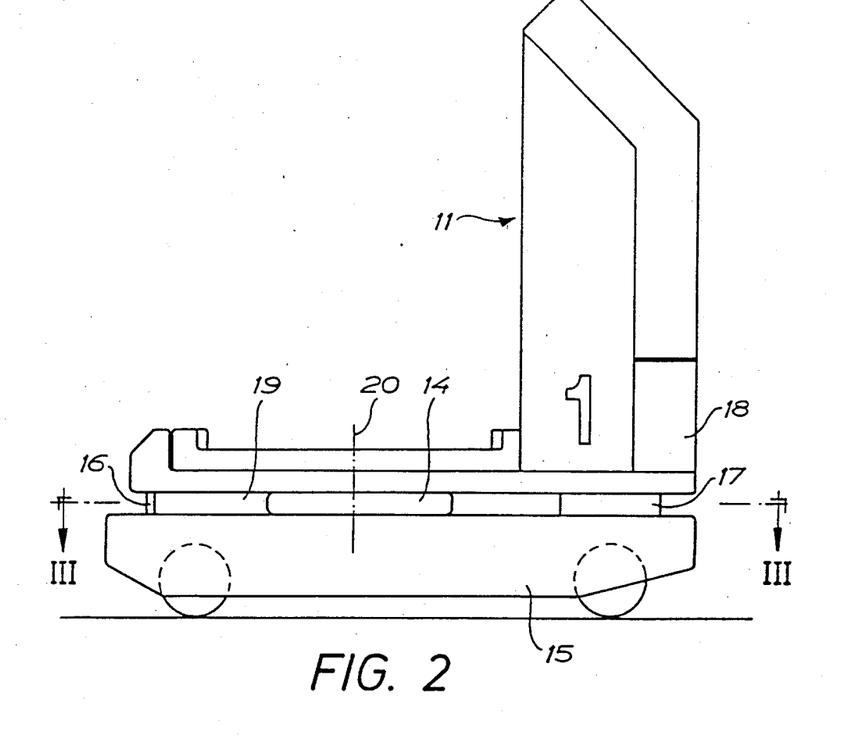
FIG. 2 is a side view of the truck.
Figure 3:
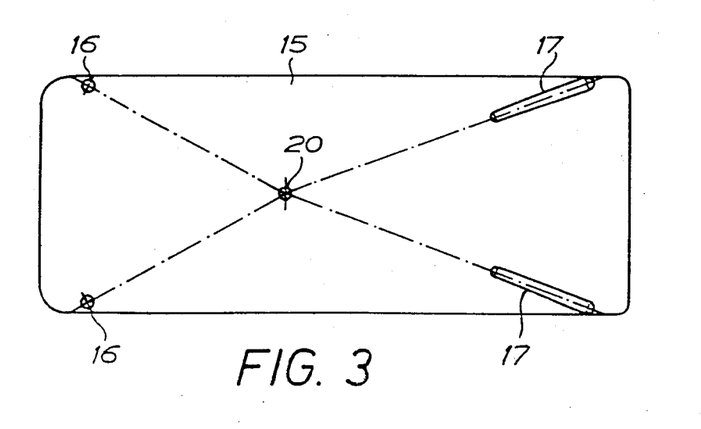
FIG. 3 is a horizontal sectional view of the truck in FIG. 2 taken along line III—III.

The body 18 of the truck may comprise suitable lifting means or other load handling means and space for electronic equipment, batteries etc.

Figure 4:
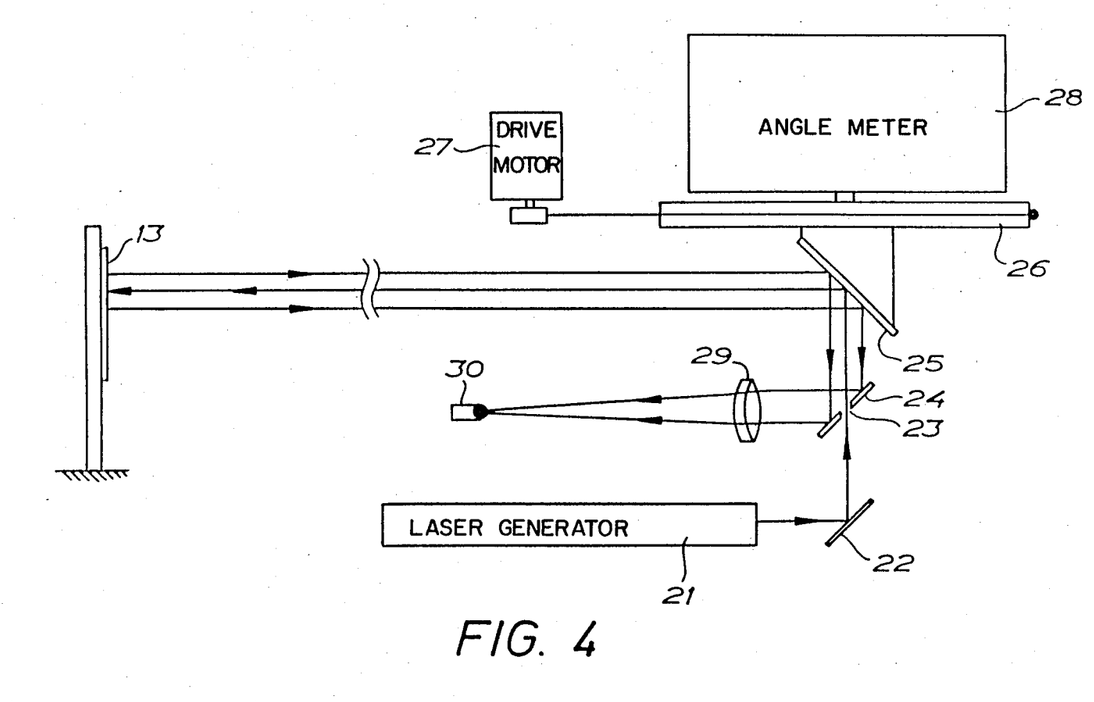
FIG. 4 is diagrammaticside view of the optical system for emitting a scanning laser beam.

The optical system may in principle be arranged as is diagrammatically shown in FIG. 4. A laser generator 21 which may be a gas laser (He-Ne) for visible light or a semiconductor laser for IR-radiation, possibly pulsed, directs its beam towards a mirror 22 which in turn directs the beam through an opening 23 in a mirror 24 to a mirror 25. The latter mirror is supported on a rotatably mounted balance wheel 26 connected over a drive belt to a drive motor 27 to be rotated at a constant rotational speed of the order of 2 or 3 revolutions per sec. The balance wheel is connected to an angle meter 28 of very high accuracy, or to a device for measuring the period used by the balance wheel to rotate at a constant speed from a reference position to a given position, the angle position of which is to be indicated. Such time measurement can be performed at very high reliability and by utilizing a simpler and less expensive device than an angle sensor of high accuracy.

When the laser beam hits a reflector 13 it is reflected back to the mirror 25 transmitting the reflected beam onto the mirror 24 from where the reflected beam by suitable optics 29 is directed onto a detector 30 to be focused thereon.

Figure 5:
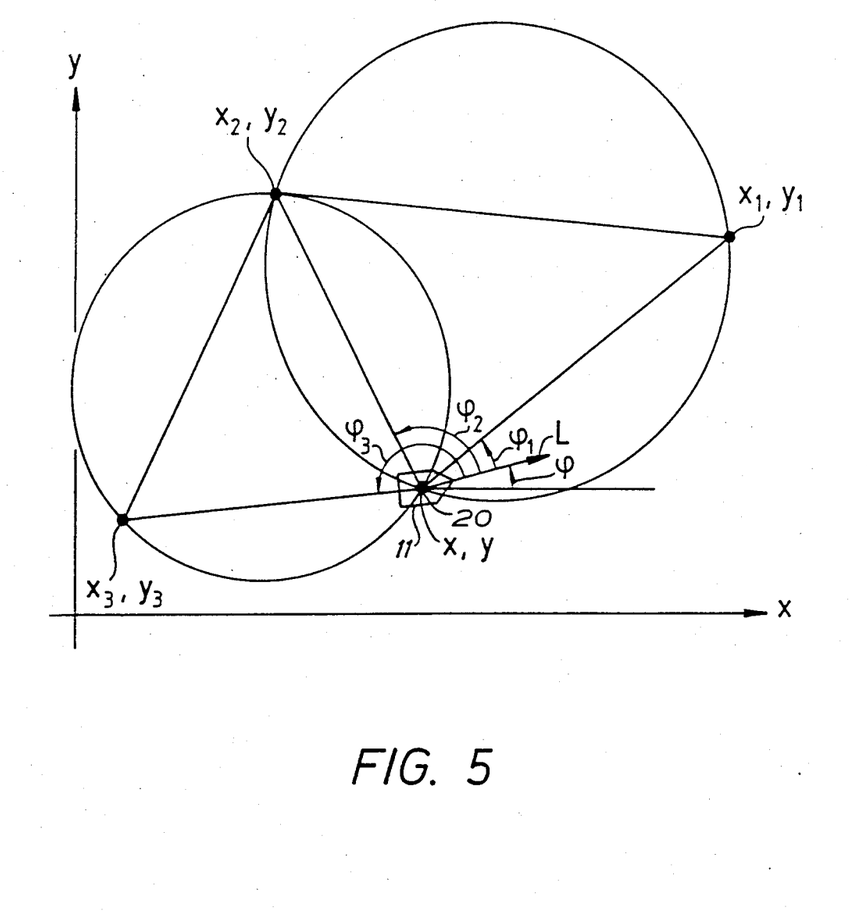
FIG. 5 is a geometrical figure for calculating the position and direction of the vehicle from the angles to three fixed reference points.

In FIG. 5 the truck is shown in a co-ordinate system, and in order to identify the position of the truck in a given moment the co-ordinates x and y for the axis 20 and the angle $\phi$ have to be determined. The angle $\phi$ is the angle between the x-axis and a vehicle reference line L, usually the longitudinal axis of the vehicle. This determination can be done by utilizing three fixed points, i.e. by using three reflectors, which the truck "sees" from the actual position. On the basis of the angles $\phi_1$, $\phi_2$ and $\phi_3$ between the sight lines from the reference point 20 of the truck to the three reflectors having the co-ordinates $(x_1y_1)$, $(x_2y_2)$ and $(x_3y_3)$, and the reference line L, the position and direction of the truck can be determined by applying conventional trigonometry as previously known per se and as described in the above mentioned publication Journal of Dynamic Systems, Measurement, and Control, September 1983, Vol. 105/153. Thus, by utilization of the optical system on the truck the angles $\phi_1$, $\phi_2$, $\phi_3$ are measured and on the basis of these angles the equation is determined for those two circles which in FIG. 5 have been drawn through the three points and the position of the truck for calculating the position and direction of the truck. Since this technique is previously known per se these trigonometrical calculations are not presented here. There is, however, a substantial difference between the system described here and those systems previously known and described in the references initially referred to: the three points needed for the calculations have not identified themselves by a coding. The truck can see more fixed points than three and, thus, it is necessary to identify these points in one way or the other.

The motion area with reflectors and path are stored in an electronic memory. The storing in the electronic memory can be done by using known technique. A method which can be applied is the utilization of a CAD system, for instance AutoCAD, which is a designing program by means of which any drawing can be reproduced in a microcomputer. By using program the plan of the truck movement area of FIG. 1 can be programmed into a micro computer. To store the decided truck path the truck as an alternative to storing via the AutoCAD program can be driven along said path and its position in relation to the reflectors be continuously stored in the program. The positions of the reflectors are determined by utilization of conventional land surveying technique, and the measured positions are stored in the program. As an alternative the reflector positions can be located by driving the truck along a known path and be determined by utilizing the ptical system and a program loaded in the computer system of the truck.

Then, when the truck shall automatically follow the defined path, a truck position and direction must first be defined so as to serve later as a base for identifying subsequent positions and directions. This can be done in different ways. According to one method the truck is placed in a predetermined position and in a predetermined direction initially defined. According to another method the position and direction are defined from three fixed points at the time, assuming that said points have certain identities, and this is repeated with reference to all fixed points visible from the truck in a given position. This results in a plurality of positions and directions for each three points, which form the basis for the calculation. The variance of the obtained result is calculated, and then the calculations are repeated with another assumption as to the identity of the points. When the assumption is found, which giving the least variance, the points are identified.

As the truckis moving, consecutive calculations of the truck position and direction are made in each individual position on the basis of the angle measurements made by the apparatus 14 to the reflectors visible from the truck in the actual position by guidance of the obstacles programmed. Thus every new positioning of the truck will be based on information previously obtained with regard to the truck position and moving direction.

It should be noted that in each truck position several determinations of the truck position and direction may be made depending on how many reflectors reaction may be made depending on how many reflectors that are seen by the truck from the actual position. since the reflectors are of a simple and inexpensive nature and do not have to transmit a coded reflected signal, the detectors can be set out generously whereby a high accuracy in the calculation of position and direction can be obtained.

Figure 6:
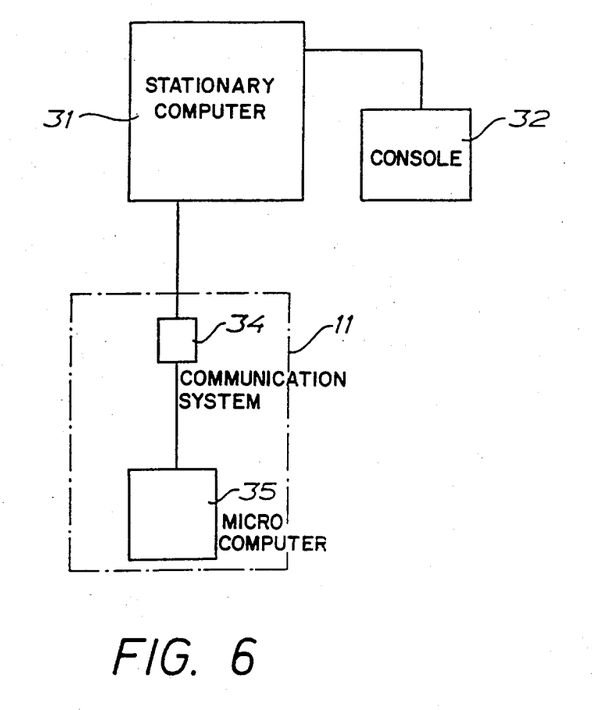
FIG. 6 is a block diagram of an electronic system for working the method according to the invention.
Figure 7:
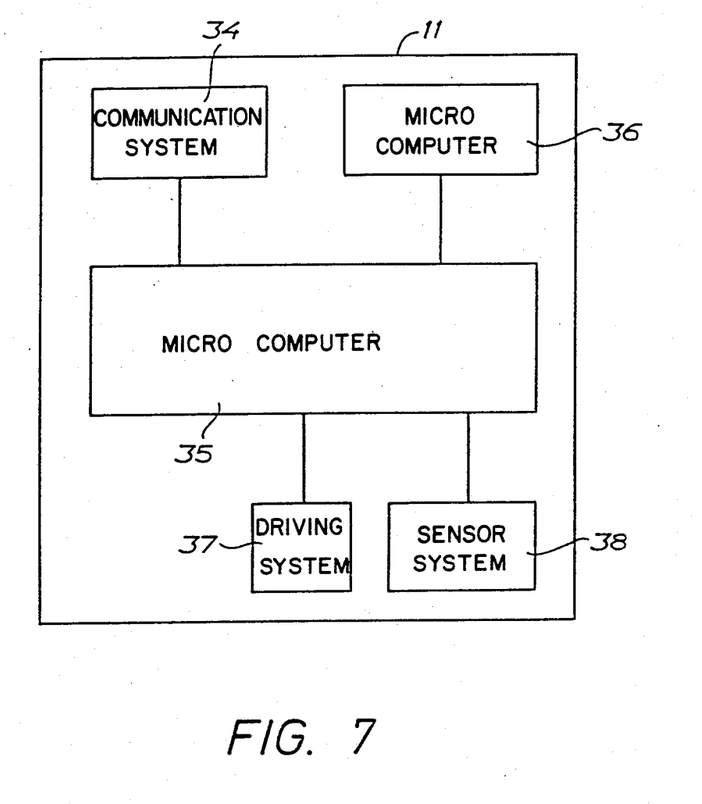
FIG. 7 is a more detailed block diagram of the electronic system arranged on the truck.

To work the method according to the invention by using the above mentioned calculations a computer system constructed in principle according to FIG. 6 is used. A controlling stationary computer 31 which can be common to many trucks, is provided for programming the motion area and the desired paths in this area, for instance by using the above mentioned AutoCAD program. The computer 31 is also connected to a operator's console 32 with a keyboard to allow temporary manual operations in the program loaded. The computer 31 is connected through a communication system 34, FIG. 6, for instance a wireless link (radio or IR) to a micro computer 35 on each truck.

The computer 31 operates as a coordinator of several trucks in a system and gives through the link the necessary information to the computer 35 on the truck. The computer 35 can be a micro computer of the type Motorola MC 68010, and it is connected to another micro computer 36 on the truck which also can be of the type Motorola MC 68010 receiving angle measurement signals from the optical system 14 and processing these signals so as to give to the computor 35 information on the momentary position and direction of the truck by applying the above mentioned method. Then in the computer 35 a comparison with the programmed data is made, and depending on the result of the comparison control signals are sent to the driving system 37 of the truck to provide the correction of the truck movement necessary to make the truck move along the predetermined path. Also connected to the computer 35 is an appropriate sensor system 38 to stop the truck movement when a risk of collision with persons or objects arises.

Figure 8:
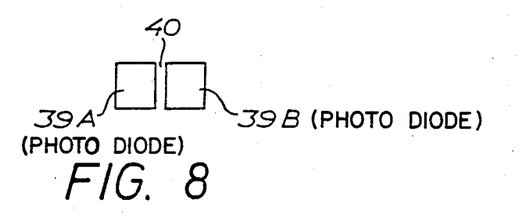
FIG. 8 is a diagrammatic front view of a detector suitable for use in the system.
Figure 9:
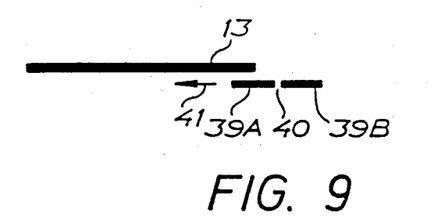
FIG. 9 is a diagrammatic plan view illustrating the scanning of a reflector by use of the detector in FIG. 8.
Figure 10:
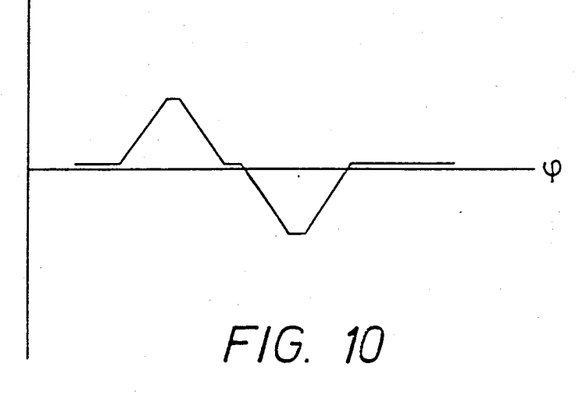
FIG. 10 is a graph illustrating the signal obtained from the detector from the scanning according to FIG. 9.

The accuracy in the control of the truck can be substantially improved by utilizing a detector of the type described in FIG. 8. This detector is of a known design and comprises two silicon photodiodes indicated at 39A and 39B. Each of the diodes has a width of the order of 100 μm, and the diodes are separated by a gap 40 of the order of 10 μm. The scanning of the reflectors 13 in principle can be regarded as a projection of the detector, that is the two silicon diodes, on the surface of the reflector. This is illustrated in FIG. 9. When the projected image of the detector is entering the reflector in the direction of the arrow 41, one silicon diode 39A will first be in the area of the reflector and then the other one. By adding the signals from the silicon diodes with reversed polarity the detector will provide a signal as illustrated in FIG. 10 where the horizontal axis defines the scanning angle and the vertical axis defines the signal from the detector. When the image of the diode 39A only is projected on the reflector, the signal from the detector will rise to a largest positive value so as to decrease again to zero later when the second diode starts to enter the reflector, as the signal provided by the second diode is subtracted from the signal from the first diode. after that no signal from the detector will be obtained until the projection of said first diode moves from the surface of the reflector, the signal from said second diode being emitted from the detector. In other words, by this arrangement there is obtained a distinct signal easy to define, which means that the determination of the angle can be done at high accuracy with a corresponding high accuracy in the determination of the position and direction of the truck.

The determination of the position and direction by applying the above described method can be completed with odometry, which means that sensors on the wheels and steering mechanism of the truck provide signals representing the distance run and the direction of the existing movement, respectively, and that these signals then are used for calculating the change of the position and direction of the truck, to that it is possible to obtain, on the basis thereof by calculations executed in the computer 36, information on the actual position and direction of the truck. The quantities hereby obtained then may be processed together with those obtained by applying the method according to the invention.

By using quantities representing the speed of the truck and easily calculated by known methods, it is also possible to compensate for the truck movement between the measurements of the angles to the fixed points. In other words, the truck is not immobilized during the measurements, and even if there is a slight movement it does effect the calculations of the position.

Means can be provided for manually controlling the truck, for instance a control panel connected to the truck through a cable.

Some minor lateral deviation between the path followed by the truck on one occasion and the path followed in the same part of the path on another occasion can be programmed providing an advantage as the truck in that case does not wear wheel tracks in the support (the floor) during movement along an unchanged path for a long time.

Essential of the invention is the method in which the position and direction of movement of the truck is determined by utilizing a number of reflectors providing anonymous reflection signals. The practical embodiment of the mechanical and electronical means through which this method is realized has been illustrated and described in the embodiment preferred at present but can be modified or replaced by other means than the one described here without departing from the scope of the appended claims.

I claim:

1. Method of navigating a vehicle for instance an industrial truck moving generally in one plane by which a determination of the actual position and direction of the vehicle is provided by measuring the angles in said plane from a reference point on the vehicle to fixed points in relation to a reference direction of the vehicle at least three angles being used for a trigonometric determination by calculation means of position and direction, characterized in that a plurality of fixed points anonymous but determined as to the position thereof are arranged for the navigation, that the position for each of the points as well as existing sight obstacles between the reference point of the vehicle and the fixed points is stored in an electronic memory, that the movement of the vehicle in said plane is initiated in a known position and with a known direction so as to identify the fixed points visible from the reference point in said position, and that in each position and direction of the vehicle during the movement thereof, the latest known position and direction are utilized to determine with the aid of the stored position of the sight obstacles the identity of the fixed points visible at the moment.

2. Method according to claim 1, characterized in that the bearing of the fixed points are taken by emitting a light beam from the vehicle, scanning horizontally, and by reflection of the light beam from reflectors in the fixed points and reception of the reflected light beam on the vehicle.

3. Method according to claim 2, characterized in that the storing of the fixed points is effected by reproducing said plane with sight obstacles and the fixed points in said electronic memory.

4. Method according to claim 3, characterized in that the reproducing is effected in a CAD system for visual representation of said plane with sight obstacles and the fixed points, the path to be followed by the vehicle being included in the visual representation.

5. Method according to claim 2, characterized in that the determination of the position of the fixed points is effected by driving the vehicle along a known path while measuring the angles to the fixed points by utilizing the optical system and the program controlled computing and storing of the positions of the fixed points in the electronic memory.

6. Method according to claim 2, characterized in that the angles are determined by measuring the period for the movement of the light beam scanning horizontally at constant speed, from a reference point to a position where it hits a reflector.

7. Method according to claim 2, characterized in that the reflected light beam is detected by utilizing two photo detectors arranged side by side, the outputs of which are added with reversed polarity and which are hit, one after the other, by the reflected light beam.

8. Method according to claim 2, characterized in that the light beam is emitted close to the plane of the floor or ground.

9. Method according to claim 1, characterized in that the vehicle during movement thereof is brought to a position in relation to a desired path, which is displaced more or less towards one side or the other of the nominal path on successive tours along said path.

10. Truck for carrying out the method according to claim 1 comprising a chassis (15) and a body (18), characterized in that the body (18) is supported on the chassis (15) at a limited number of positions leaving a gap (19) between the body and the chassis, and that means (14) for emitting a light beam scanning horizontally is placed in the gap, existing means (16, 17) for supporting the body on the chassis of said positions having a limited extension in the path of the scanning movement of the light beam.

* * * * *

UNITED STATES PATENT AND TRADEMARK OFFICE
CERTIFICATE OF CORRECTION

PATENT NO. : 4,811,228
DATED : 7 March 1989
INVENTOR(S) : Kalevi Hyyppa

It is certified that error appears in the above-identified patent and that said Letters Patent is hereby corrected as shown below:

Column 1, line 38, "systems" should be --system--;

Column 2, line 22, "3is" should be --3 is--;

Column 2, line 24, "diagrammaticside" should be --diagrammatic side--;

Column 3, lines 46, 52 and 61,"$\emptyset$" should be --$\varphi$--; (all occurrences)

Column 4, line 13, after "using" insert --this--;

Column 4, line 24, "ptical" should be --optical--;

Column 4, line 44, "truckis" should be --truck is--;

Column 4, line 54-55, delete "reaction may be made depending on how many reflectors";

Column 4, line 56, "since" should be --Since--;

Column 5, line 50, "after" should be --After--:

Signed and Sealed this

Twenty-eighth Day of November 1989

*Attest:*

JEFFREY M. SAMUELS

*Attesting Officer*     *Acting Commissioner of Patents and Trademarks*